United States Patent

Castañeda et al.

[11] Patent Number: 5,770,330
[45] Date of Patent: Jun. 23, 1998

[54] BATTERY PACKAGE WITH MULTIPLE SURFACE CHARGING CONTACTS

[75] Inventors: Julio C. Castañeda, Coral Springs; Tyler D. Jensen, Sunrise, both of Fla.; Barbara A. Ruth, Cumming, Ga.

[73] Assignee: Motorola, Inc., Schaumburg, Ill.

[21] Appl. No.: 736,633

[22] Filed: Oct. 24, 1996

[51] Int. Cl.[6] .................................................. H01M 2/30
[52] U.S. Cl. .......................................... 429/123; 429/178
[58] Field of Search ............................. 429/96, 123, 178, 429/180

[56] References Cited

U.S. PATENT DOCUMENTS

| | | | |
|---|---|---|---|
| 4,898,796 | 2/1990 | Furukawa et al. | 429/178 |
| 5,093,215 | 3/1992 | Hasegawa et al. | 429/178 |
| 5,317,247 | 5/1994 | Chong et al. | 320/2 |
| 5,421,745 | 6/1995 | Aksoy et al. | 439/626 |
| 5,578,391 | 11/1996 | Meyers et al. | 429/123 X |
| 5,626,980 | 5/1997 | Ruth et al. | 429/100 |
| 5,631,101 | 5/1997 | Amero | 429/123 X |

*Primary Examiner*—Stephen Kalafut
*Attorney, Agent, or Firm*—M. Mansour Ghomeshi

[57] ABSTRACT

A battery (100) includes charging contacts (102) having a number of exposed planes (104, 106, and 108) for versatility charging battery cells (112) via a number of charging configurations (402 and 502). Three different charging embodiments; a radio charging structure (302), a vertical charging apparatus (502) and a horizontal charger (402) are presented. These chargers may be conveniently designed without limiting their versatility as is commonly imposed by contact limitations experienced with battery packages of the prior art.

9 Claims, 6 Drawing Sheets

BATTERY PACKAGE WITH MULTIPLE SURFACE CHARGING CONTACTS

FIELD OF THE INVENTION

This invention is in general related to batteries and more particularly to rechargeable batteries.

SUMMARY OF THE INVENTION

Rechargeable batteries used for powering electronic devices, often include exposed charging contacts for providing an interface to a charging apparatus. In general, the charging contacts connect to contact pins of a charging apparatus through which a charging current is supplied to the battery. The configuration of presently available charging contacts are such that chargers designed to work with such batteries need to follow strict requirements for their charging pins. With added versatility in today's electronic devices, it is often desired to have a multiplicity of charging apparatuses that can provide charging current to a battery without compromising comfort and ease of use.

DETAILED DESCRIPTION OF THE PREFERRED EMBODIMENT

Portable electronic devices use rechargeable batteries as their main source of power. These batteries are charged via chargers that take numerous configurations and cosmetic shapes. Contacts on batteries have traditionally been designed in one uniform fashion and have required the charger design to accommodate the single structure. The present invention provides for a battery charging scheme where contacts to the battery cells may be provided from a number of different planes. This structure provides for added ease designing charging structures to conveniently charge the battery in accordance with the present invention. The details of this invention will be better understood by referring to a series of drawings where like numerals are carried forward.

Figure 1:
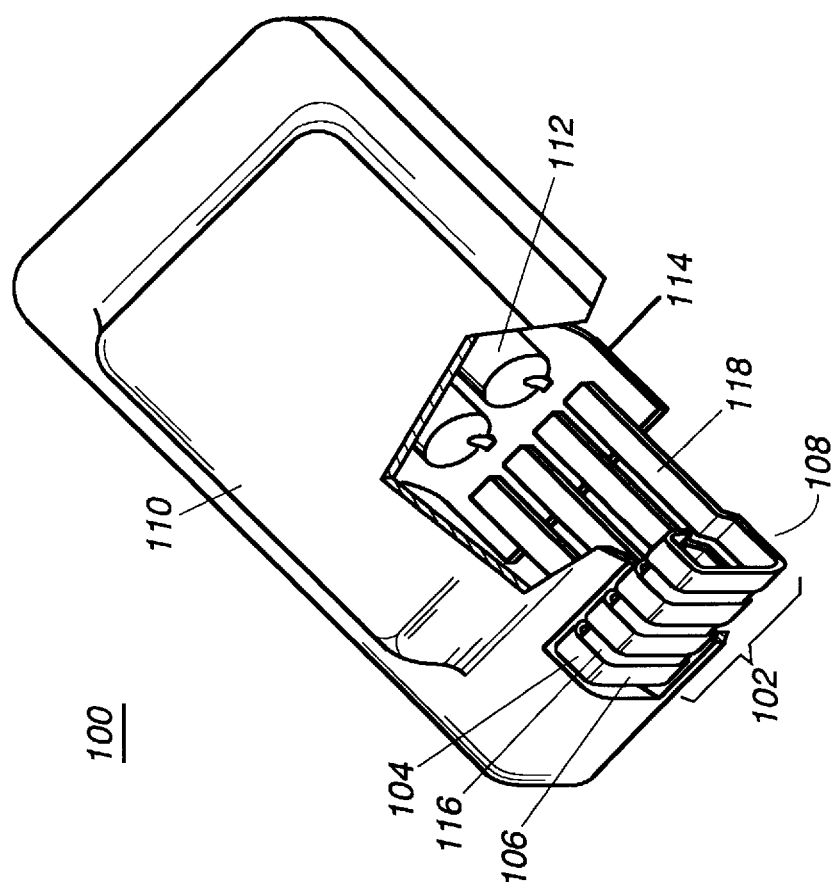
FIG. 1 is battery package showing details of the charging contacts in accordance with the present invention.
Figure 2:
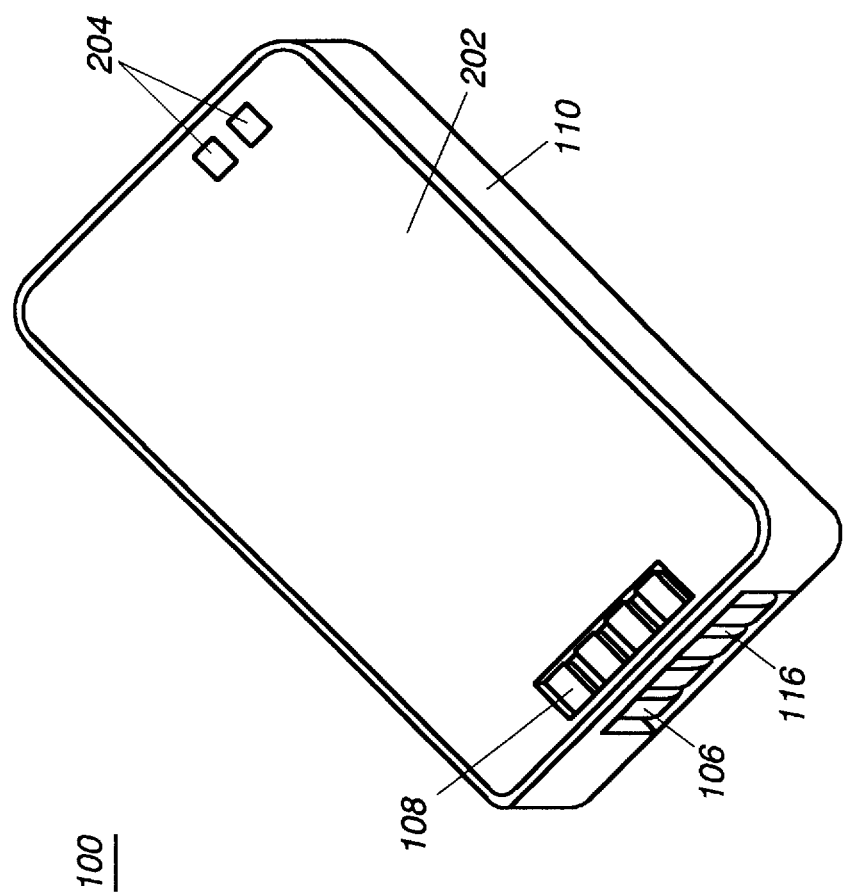
FIG. 2 shows a second view of the battery of FIG. 1 in accordance with the present invention.

Referring first to FIGS. 1 and 2 isometric views of a battery 100 in accordance with the present invention is shown from two different angles in order to present the several surfaces thereof. The battery package 100 includes a battery housing 110 wherein battery cells 112 are situated. The battery cells 112 provide the main storage mechanism of energy for the package 100. Also included in the battery 100 are charging contacts 102 which are connected to the battery cells 112. This connection may be via a piece of wire, a flexible circuit, or simply a direct connect. In the preferred embodiment, a flexible circuit 114 is used. The coupling of the contacts 102 to the circuit 114 is provided via tabs 118 and an attachment mechanism such as solder. The charging contacts 102 are exposed to the outside of the battery housing 110 on several planes and include a number of surfaces 104, 106, and 108. The charging contacts are preferably made of nickel 200 base material and may be gold plated. As will be described later, each one of these surfaces 104, 106, and 108 will be used to charge battery cells 112 via different charging apparatuses.

Figure 6:
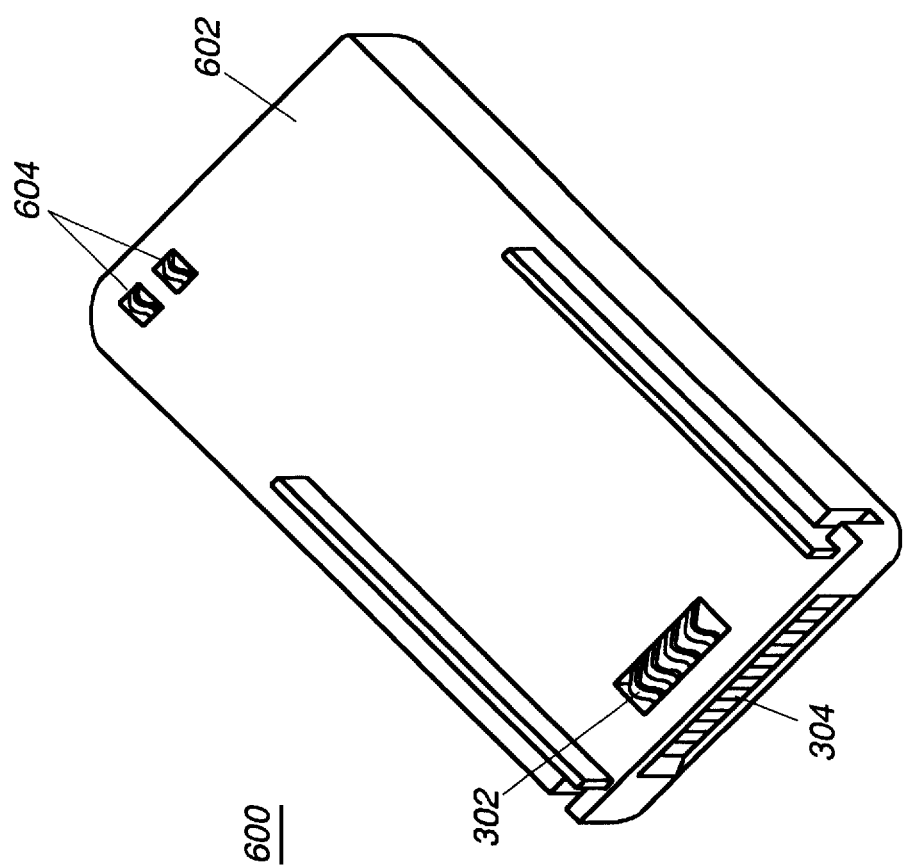
FIG. 6 shows a relevant view of a communication device in accordance with the present invention.

The battery 100 includes a number of surfaces including surface 202 (FIG. 2) which provides the interface to an electronic device such as a radio communication device 600 (FIG. 6). The mechanical attachment of the battery 100 to the electronic device 600 is accomplished via well known techniques such as hooks, latches and/or rails. The charging contacts 102 are exposed through the several openings on the radio surfaces of the battery 100. The exposed charging contact planes are optimally designed to provide for maximum versatility of the battery 100, as it is mated with a variety of charging apparatuses. In the preferred embodiment, the charging planes are exposed through an opening separated by nonconductive thermoplastic dividers 116. The plane 108 of the charging contacts 102 is exposed to the surface 202 and provides for a charging path or electrical connection for other use between the battery 100 and an electronic device 600. Battery contacts 204 provide the device 600 with battery power.

Figure 3:
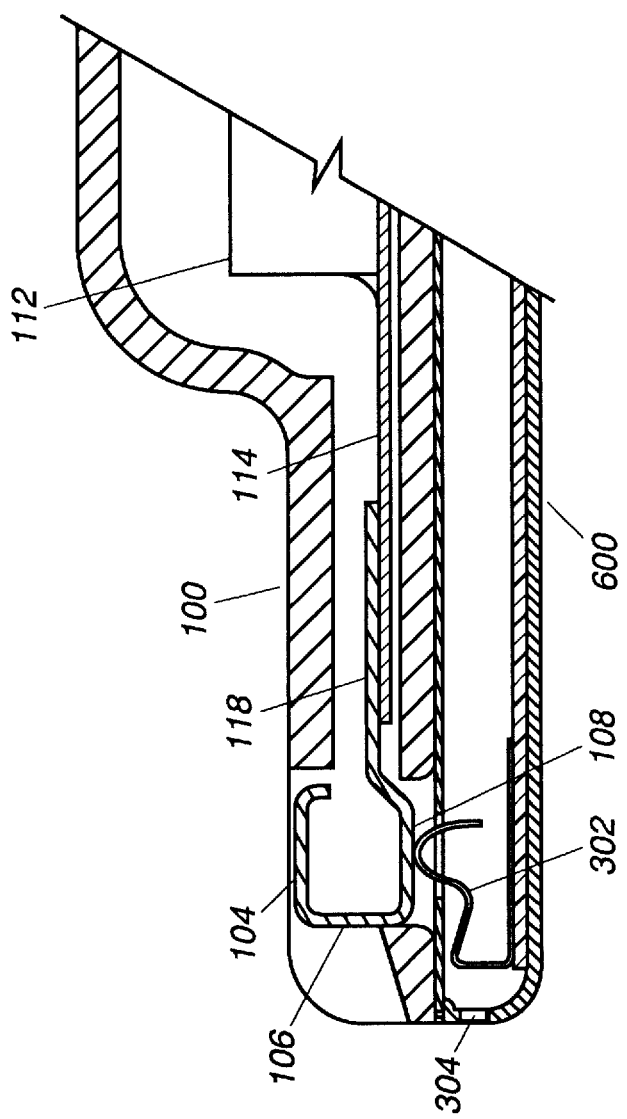
FIG. 3 shows a battery connected to a communication device in accordance with the present invention.

Referring to FIG. 3, the combination of the battery 100 and an electronic device such as a communication device 600 is shown. The device 600 includes a charging/power pin 302 that connects to charging contacts 102 through plane 108 thereby creating an electrical connectivity. The charging scheme used in this fashion includes a path that is created between contact 304 which is an external contact between the communication device 600 and a power source. The current from this power source is routed to the charging/power pins 302 and then continues on to the cells 112 via contact surface 108. This charging scheme is particularly useful with such devices as cigarette lighter chargers that are conveniently coupled to the communication device 600. Under this scheme, the communication device 600 can continue to receive operating power from the cigarette lighter and simultaneously provide charging current to the battery 100.

Figure 4:
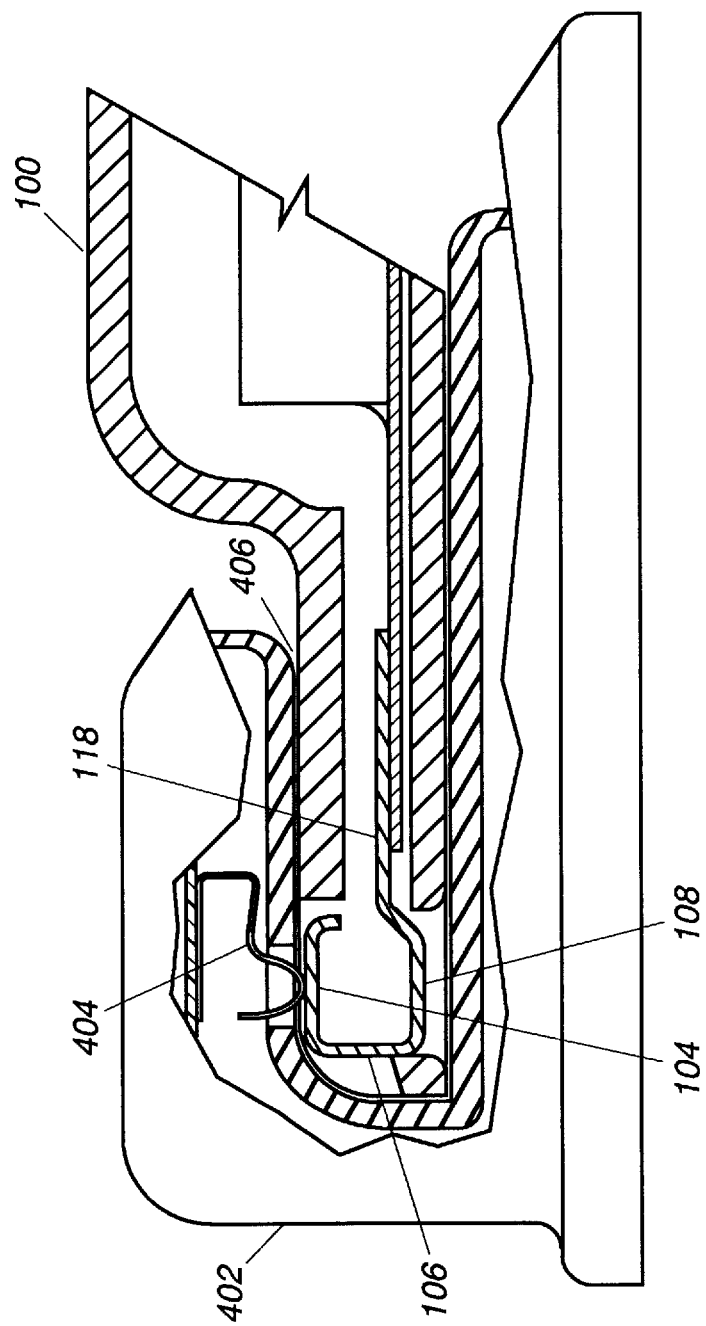
FIG. 4 shows the combination of a battery and a first style of charger in accordance with the present invention.

Referring next to FIG. 4, a battery 100 is shown placed in a first style of charger, namely a horizontal mount charger 402. The charger 402 includes a cavity 406 in which the battery is placed in order to receive a charging current. In this configuration, the surface 104 is used for contacting the charging pin 404 of the charger 402. As can be seen, the charger 402 does not have to be designed around a fixed single plane charging contact as is traditionally the case in the prior art. Although this charger 402 is shown to provide room sufficient for the battery 100, one can reasonably see that the cavity 406 can be extended to accommodate the communication device 600.

Figure 5:
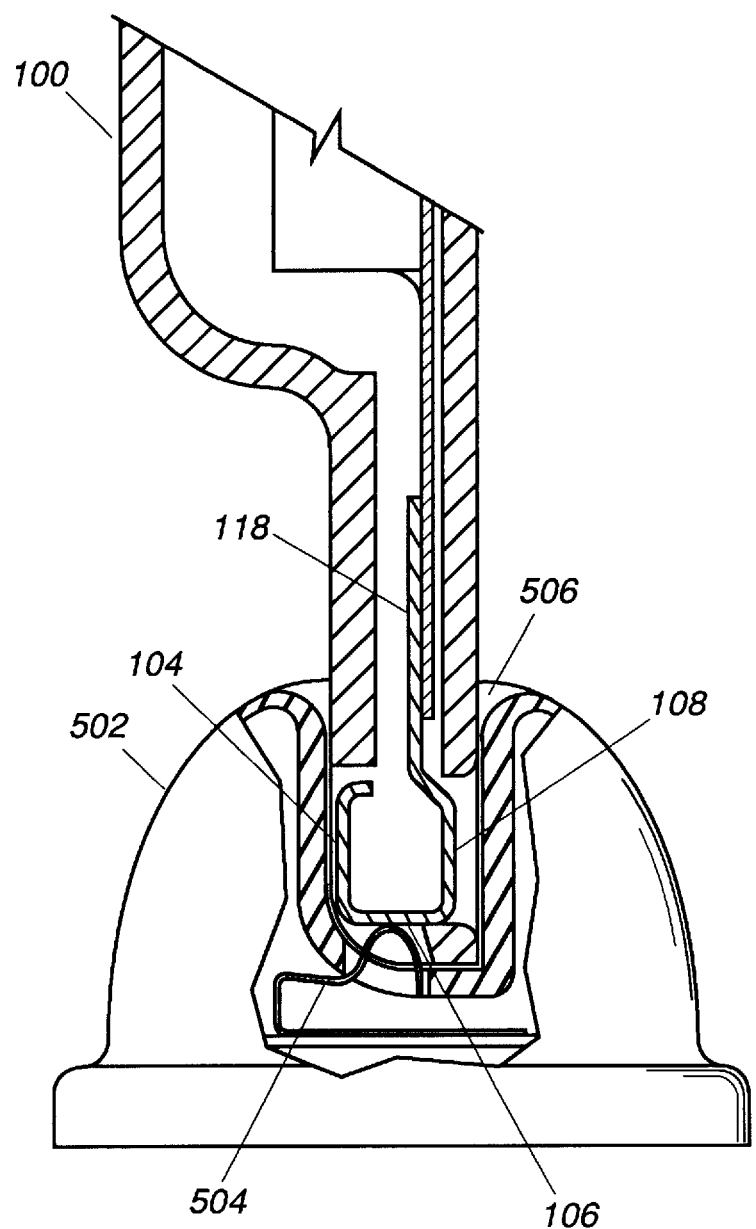
FIG. 5 shows the combination of a battery and a second style of charger in accordance with the present invention.

Referring next to FIG. 5, a second style of charger, namely a vertical mount charger 502 is shown providing charging current to the battery 100. The charging surface used here is the bottom plane 106 of the charging contacts 102 is used in contacting a charging pin 504 for providing charging and or operational power to the battery 100 and/or battery/communication device 600. One again, it can be seen that the design of the charger takes full advantage of the versatility offered by the multi-plane charging contacts 102 of the battery 100. No compromises will have to be made in the design of the charger 502 which is otherwise required of the systems of the prior art. In this charger 502, a cavity 506 accommodates the battery 100 and can be designed with additional room to house the device 600 connected to the battery 100.

Referring to FIG. 6 now, details of the communication device 600 are shown in accordance with the present invention. Charging pins 302 are shown on the major surface 602 of the radio communication device that come in contact with planes 108 of the battery 100. Power contacts 604 are also shown that are used in alternative embodiments for providing operational power from the battery 100 through the battery power contacts 204. Contacts 304 may be used for providing communication between the radio 600 and an external device such as a converter to convert the device 600 from a portable to a mobile or fixed station. However, in accordance with the present invention, some of the contacts of the connector 304 are used to provide power from an external charger to the radio 600. Some of the current provided is routed to the battery 100 for charging thereof.

It has been shown that by utilizing multi-plane charging contacts 102 in the battery structure 100 one can design highly versatile chargers which take full advantage of the various planes 104, 106, and 108. This versatility minimizes the compromises which is otherwise needed in the design of the chargers.

What we claim is:

1. A battery package for use with a communication device, comprising:
   a battery housing having a first major surface for interfacing with the communication device and at least two additional surfaces;
   at least one battery cell located within the battery housing for providing the communication device with operational energy;
   a plurality of charging contacts coupled to the at least one battery cell, the plurality of charging contacts comprising:
      a first plane extending out of the first major surface for providing electrical connection between the at least one battery cell and the communication device;
      second and third planes extending out of the additional surfaces for providing charging contacts between the at least one battery cell and at least two different styles of battery chargers.

2. The battery package of claim 1, wherein the plurality of charging contacts further include an additional surface to which the at least one battery cell is coupled.

3. The battery package of claim 1, further including at least one battery contact for providing a power path between the battery package and the communication device.

4. The battery package of claim 1, wherein the plurality of charging contacts include gold plated battery contacts.

5. The battery package of claim 1, wherein the plurality of charging contacts include nickel plated battery contacts.

6. A battery assembly for powering an electronic device, the battery assembly comprising:
   a battery housing having a plurality of surfaces each including a plurality of openings thereon;
   at least one battery cell situated in the battery housing to provide operational power to the electronic device;
   a plurality of contacts for charging the at least one battery cell and also providing the electronic device with a power supply path, the contacts including:
      a first plane extending out of one of the plurality of openings for coupling the at least one battery cell to the electronic device at one of the plurality of surfaces;
      a second plane for coupling the at least one battery cell to a first style of charger; and
      a third plane for coupling the at least one battery cell to a second style of charger.

7. The battery assembly of claim 6, wherein the first style of charger includes a vertical mount charging device.

8. The battery assembly of claim 6, wherein the first style of charger includes a horizontal mount charging device.

9. The battery package of claim 7, wherein the charging device is included in a radio communication device.

* * * * *